(12) United States Patent
Zhang et al.

(10) Patent No.: US 10,838,841 B2
(45) Date of Patent: Nov. 17, 2020

(54) GROUPING LOG PIECES OF DIFFERENT CONTEXT WITHIN A LOG FILE IN VIRTUALIZATION SYSTEM

(71) Applicant: VMware, Inc., Palo Alto, CA (US)

(72) Inventors: Yao Zhang, Beijing (CN); Olivier Alain Cremel, Palo Alto, CA (US); Ming Chen, Beijing (CN); Chunyan Ji, Beijing (CN); Jingtao Zhang, Beijing (CN); Hua Chen, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 174 days.

(21) Appl. No.: 16/044,518

(22) Filed: Jul. 25, 2018

(65) Prior Publication Data

US 2020/0034271 A1 Jan. 30, 2020

(51) Int. Cl.
| | |
|---|---|
| *G06F 11/00* | (2006.01) |
| *G06F 11/34* | (2006.01) |
| *G06F 9/455* | (2018.01) |
| *G06K 9/62* | (2006.01) |
| *G06N 20/00* | (2019.01) |

(52) U.S. Cl.
CPC ...... *G06F 11/3476* (2013.01); *G06F 9/45558* (2013.01); *G06K 9/6223* (2013.01); *G06N 20/00* (2019.01); *G06F 2009/45591* (2013.01)

(58) Field of Classification Search
CPC ............... G06F 11/079; G06F 11/3476; G06F 9/45558; G06K 9/6223
See application file for complete search history.

(56) References Cited

U.S. PATENT DOCUMENTS

| | | | | |
|---|---|---|---|---|
| 7,581,220 | B1 * | 8/2009 | Roeck | G06F 9/542 |
| | | | | 711/100 |
| 7,774,790 | B1 * | 8/2010 | Jirman | G06F 11/3419 |
| | | | | 719/318 |
| 2007/0083645 | A1 * | 4/2007 | Roeck | G06F 11/2046 |
| | | | | 709/224 |
| 2017/0168955 | A1 * | 6/2017 | Boehm | G06F 12/0864 |
| 2017/0249176 | A1 * | 8/2017 | Elias | G06F 9/45558 |
| 2019/0179695 | A1 * | 6/2019 | Noe | G06F 11/0751 |

* cited by examiner

*Primary Examiner* — Joshua P Lottich
(74) *Attorney, Agent, or Firm* — SU IP Consulting

(57) ABSTRACT

A method for log analysis includes receiving log outputs from an application and generating a log file by recording the log outputs in the log file and, for each log output in the log file, attaching a log context record to the log output. The log context record is encoded with a call stack having stack frames and one or more variables in the stack frames. The method further includes grouping the log outputs in the log file based on their log context records.

19 Claims, 3 Drawing Sheets

GROUPING LOG PIECES OF DIFFERENT CONTEXT WITHIN A LOG FILE IN VIRTUALIZATION SYSTEM

BACKGROUND

Log analysis is an important way for administrators and support engineers to troubleshoot an issue with an application and identify its root cause. The efficacy of the analysis highly depends on the quality of the logs.

DETAILED DESCRIPTION

Figure 1:
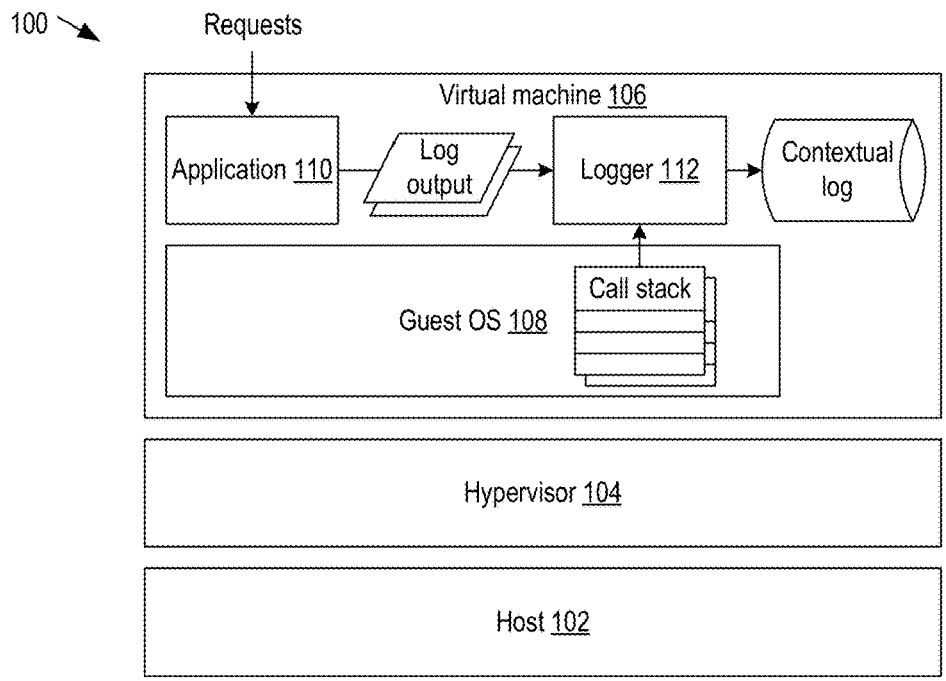
FIG. 1 is a block diagram illustrating a computing system with a logger running on a virtual machine in some examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Log analysis is an important way for administrators and support engineers to troubleshoot an issue with an application and identify its root cause. The efficacy of the analysis highly depends on the quality of the logs. Good logs should contain contextual information such as session ID and thread ID. Without such contextual information, a support engineer would have difficulty identifying the root cause of an error. This is especially true for common modern applications that handle different requests in different threads in parallel.

Examples of the present disclosure use call stack information of each log output to automatically find contextual information for the log output. The strategy here is that the logs from the same context, such as the same thread, the same session, or the same transaction, have more similar call stacks than those in different context.

FIG. 1 is a block diagram illustrating a computing system 100 in some examples of the present disclosure. System 100 includes a host computer 102 running a hypervisor 104, which runs a virtual machine 106. Virtual machine 106 runs a guest operating system (OS) 108, which runs an application 110. Application 110 may be a web server that provides web services, including handling different requests in different threads. Guest OS 108 may also run a logger 112 for generating and analyzing a contextual log.

Logger 112 receives log outputs from application 110 and stores them in a log. During each log output, logger 112 generates a log context record (LCR) encoded with the full call stack with variables and attaches the LCR to a corresponding line in the log, thereby creating a contextual log. Logger 112 retrieves the call stack by making a system call to guest OS 108 or by using a library to retrieve the call stack. During trouble shooting, logger 112 groups log lines using the features in the LCRs. For example, logger 112 may use a machine learning clustering algorithm to group the log lines based on distances between their LCRs. Once grouped, a support engineer may determine the context of each group of log lines, such as being in the same thread, session, or transaction, to help identify the cause of an error.

Figure 2:
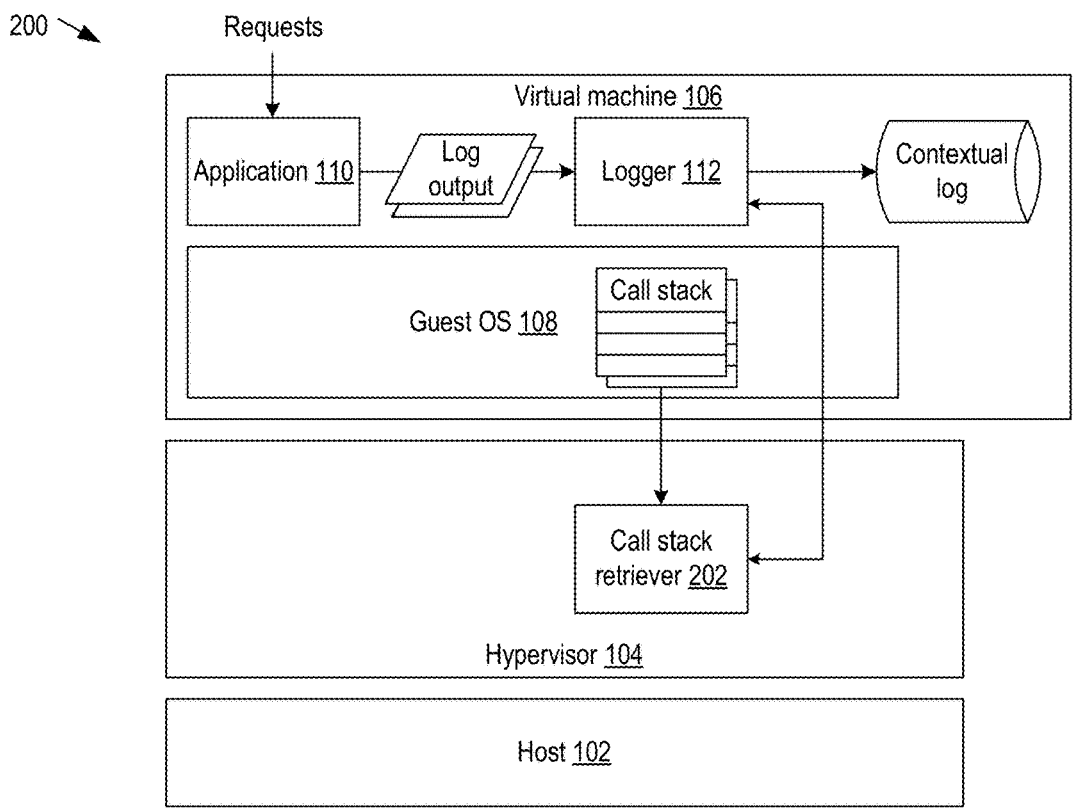
FIG. 2 is a block diagram illustrating a computing system with a logger as part of a hypervisor in some examples of the present disclosure.

FIG. 2 is a block diagram illustrating a computing system 200 in some examples of the present disclosure. System 200 is similar to system 100 except logger 112 retrieves the call stack through hypervisor 104. For example, logger 112 retrieves the call stack by making a call to a call stack retriever 202 in hypervisor 104, which retrieves the call stack from guest OS 108 and returns it to logger 112. Logger 112 may communicate with call stack retriever 202 through any guest-host interface that is capable of passing information between guest OS 108 and hypervisor 104, such as VMware Tools service.

Figure 3:
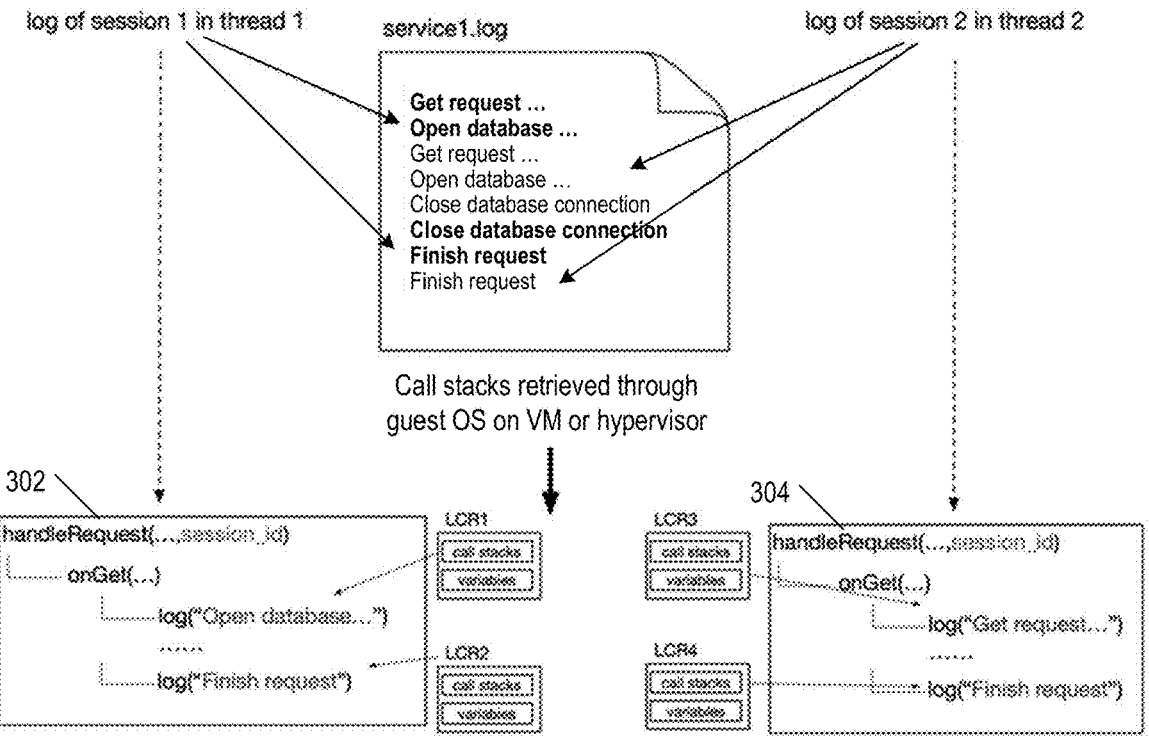
FIG. 3 is a block diagram illustrating a scenario to demonstrate the functions of the logger of FIGS. 1 and 2 in some examples of the present disclosure.

FIG. 3 is a block diagram illustrating a scenario to demonstrate the functions of logger 112 (FIGS. 1 and 2) in some examples of the present disclosure. Application 110 (FIGS. 1 and 2) includes code 302 of a thread 1 having two lines that log "Open database" and "Finish request" calls. When application 110 generates a log output for "Open database" in thread 1, logger 112 records the log output in a log named "service1.log." Logger 112 also retrieves the full call stack of thread 1, generates an LCR 1 with the full call stack of thread 1, and attaches LCR 1 to the log output of "Open database" in servicetlog. When application 110 generates a log output for "Finish request" in thread 1, logger 112 records the log output in service1.log. In service1.log, the log outputs of thread 1 is shown in bold. Logger 112 also retrieves the full call stack of thread 1, generates an LCR 2 with the full call stack of thread 1, and attaches LCR 2 to the log output of "Finish request" in service1.log.

Application 110 (FIGS. 1 and 2) also includes code 304 for a thread 2 having two lines that log "Get request" and "Finish request" calls. When application 110 generates a log output for "Get request" in thread 2, logger 112 records the log output in service1.log. Logger 112 also retrieves the full call stack of thread 2, generates an LCR 3 with the full call stack of thread 2, and attaches LCR 3 to the log output of "Get request" in service1.log. When application 110 generates a log output for "Finish request" in thread 2, logger 112 records the log output in service1.log. In service1.log, the log outputs of thread 2 is shown with normal (unbold) text. Logger 112 also retrieves the full call stack of thread 2, generates an LCR 4 with the full call stack of thread 2, and attaches LCR 4 to the log output of "Finish request" in service1.log.

Figure 4:
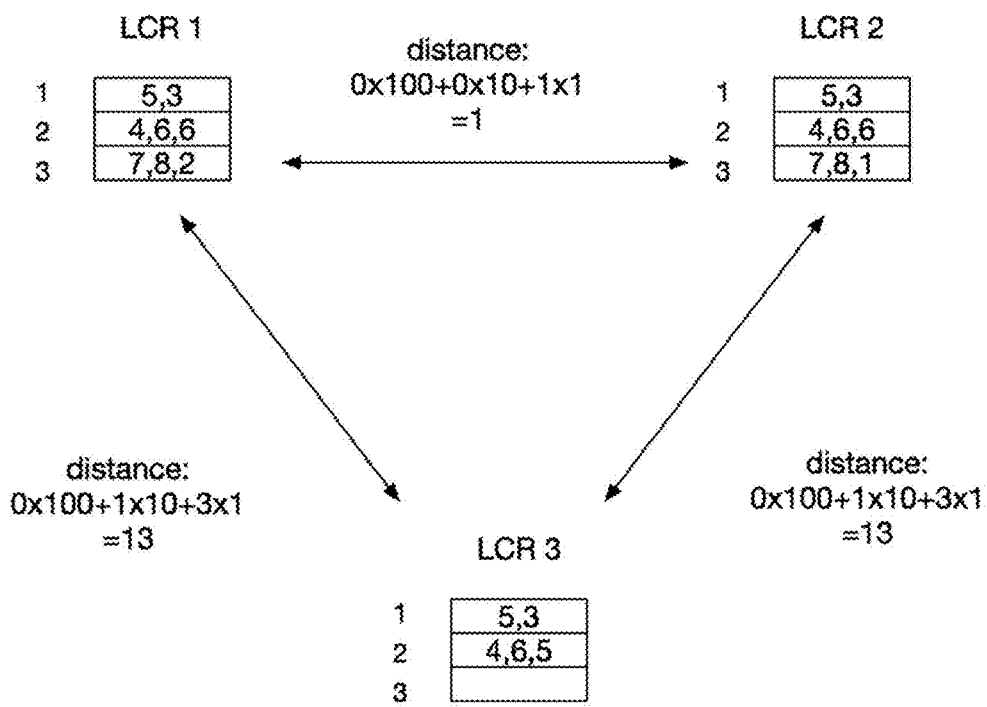
FIG. 4 is a block diagram illustrating the data structure for each log context record (LCR) in some examples of the present disclosure.

FIG. 4 is a block diagram illustrating the data structure for LCRs in some examples of the present disclosure. Each LCR includes layers each representing a stack frame and variables in the stack frame. For example, LCR 1 has four (4) layers representing four (4) stack frames. The first layer (stack frame) contains 2 variables: 5 and 3; the second layer (stack frame) has 3 variables: 4, 6, and 6; and the third layer (stack frame) has 3 variables: 7, 8, and 2.

To group the log outputs according to their LCRs (calls stacks), logger 112 (FIGS. 1 and 2) calculates the distance (similarity) between every pair of LCRs. In some examples of the present disclosure, logger 112 calculates the distance as follows.

Logger 112 determines the largest number of layers among the LCRs (call stacks), and fills any LCR (call stack) that has less layers (stack frames) with one or more empty layers (stack frames) to bring all the LCRs up to the largest number of layers (stack frames).

Logger 112 gives each layer (stack frame) a weight, with the higher layers given the greater weights. The weights ensure the higher layers always dominates the final calculated distance. For example, the function to calculate the weight is: w(layer, total_layers)=exp(base, total_layers—layer) where layer is a selected layer, total_layers is the total number of layers, and base is a selected base for exponentiation. For example, when total_layers is 3 and base is 10, the weight of layer 1 is w(1,3)=exp(10,3−1)=100, the weight of layer 2 is w(2,3)=exp(10,3−2)=10, the weight of layer 3 is w(3,3)=exp(10,3−3)=1. The base can be set higher as the number of layers (stack frames) increase. For example, base may be set to 100 when the call stack has more than 10 stack frames.

Logger 112 calculates the distance between two LCRs (call sacks) as the sum of each layer (stack frame) distance. The layer (stack frame) distance is equals to weight*number_of_different_values, where number_of_different_values is the number of different variables for a particular layer of the two LCRs. For example, the distance between LCR 1 and LCR 2 is calculated as follows:

Layer (stack frame) 1 distance=100*0 where the weight is 100 and 0 means there are no different variables.

Layer (stack frame) 2 distance=10*0 where weight is 10 and 0 means there are no different variables.

Layer (stack frame) 3 distance=1*1 where the weight is 1 and there is one different variable (the third variable 2< >1).

The overall distance between LCRs 1 and 2 is 0x100+0x10+1x1+0=1.

Similarly calculated, the overall distance between LCRs 1 and 3 is 0x100+1x10+3x1=13, and the overall distance between LCRs 2 and 3 is 0x100+1x10+3x1=13. Although a specific distance function is provided, other functions for expressing similarity between LCRs may be used.

Figure 5:
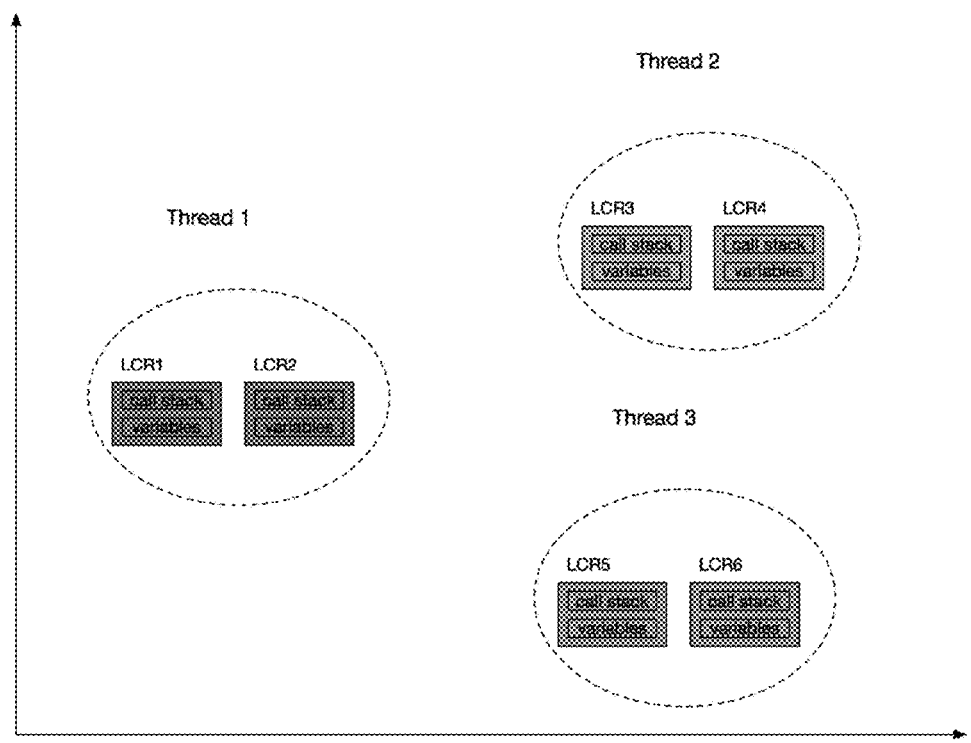
FIG. 5 is a block diagram illustrating a grouping of log outputs based on a distance function for the LCRs in some examples of the present disclosure.

FIG. 5 is a block diagram illustrating a grouping of the log outputs based on the distance function for the LCRs in some examples of the present disclosure. With the distance function, logger 112 may use machine learning clustering algorithm, such as k-means clustering, to group the log outputs according to the distances between their LCRs. First, a number of groups is set. The number of groups may be set automatically as the number of times the most frequent log message appears in the log file. For example, if "Get request" log message is the most frequent log message and it appears three (3) times in the log file, the number of groups may be set to three (3). The k-means clustering algorithm then randomly selects three (3) LCRs as group centroids. The k-mean clustering algorithm calculates the distances (similarities) between each LCR and the group centroids and places the LCR in the group with the nearest group centroid (smallest distance). After one loop, all the LCRs are placed into the groups. The k-mean clustering algorithm recalculates the group centroids based on the LCRs in the groups, and starts over again to place each LCR in the group with the nearest updated centroid. This process may iterate for a number of times or until convergence, such as when the group centroids remain relatively constant. For example, FIG. 5 shows LCRs 1 and 2 are grouped together, LCRs 3 and 4 are grouped together, and LCRs 5 and 6 are grouped together. Based on their grouping, a support engineer may determine each group's common context, such as their common threads.

During troubleshooting, a support engineer may use the grouping of the log outputs from a contextual log or each group's common context to identify the cause of an error in system 100 or 200 (FIG. 1 or 2) and correct the error. For example, an administrator finds one or more error log outputs in a log file stating "failed to open database!" To find the cause of the error, a support engineer examines the detailed information of this open database action. The support engineer needs to find other log outputs in the same session that contain information like database name and table name, as one possible cause of the error is that the session was attempting to access an invalid table. The log file may contain logs from different sessions. The support engineer uses logger 112 (FIG. 1 or 2) to perform LCR grouping on the contextual log and display the result. Based on the LCR grouping, the support engineer can quickly and easily find the database name the table name in the same group with the one or more "fail to open database" log output and then determine if the session was attempting to open an invalid table. If the session was attempting to open an invalid table, the support engineer may correct the error by providing a valid table name to the requester or provide the requested table in the database.

Alternatively, the troubleshooting may be automated using logical rules or machine learning to use the grouping of the log outputs or each group's common context to identify the cause of an error in system 100 or 200 and correct the error. For example, logger 112 detects one or more error log outputs in a log file stating "failed to open database!" To find the cause of the error, logger 112 performs LCR grouping on the contextual log to find other log outputs in the same session that contain information like database name and table name, as one possible cause of the error is that the session was attempting to access an invalid table. Logger 112 visually displays the LCR grouping to a support engineer, who can quickly and easily find the database name the table name in the same group with the one or more "fail to open database" log output and then determine if the session was attempting to open an invalid table. If the session was attempting to open an invalid table, the support engineer may correct the error by providing a valid table name to the requester or provide the requested table in the database. Optionally, logger 112 may use logical rules or machine learning to automatically correct the error by providing a valid table name to the requester or provide the requested table in the database.

Figure 6:
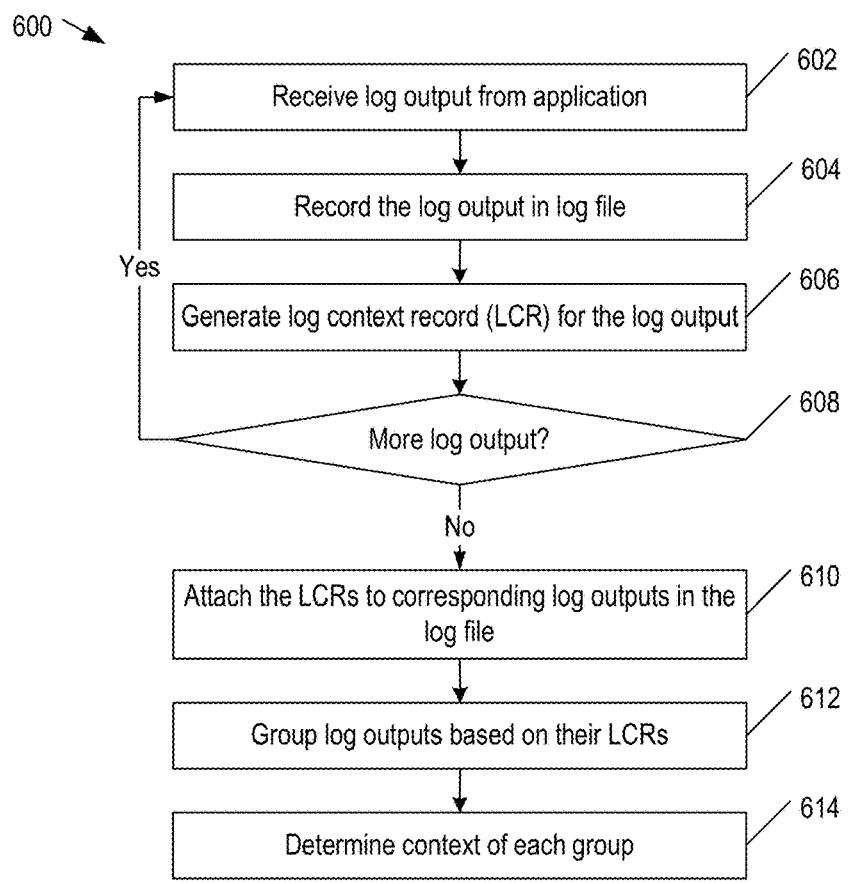
FIG. 6 is a block diagram illustrating a flowchart of a method for the logger of FIGS. 1 and 2 to generate and analyze a contextual log in some examples of the present disclosure.

FIG. 6 is a block diagram illustrating a flowchart of a method 600 for logger 112 (FIGS. 1 and 2) to generate and analyze a contextual log in some examples of the present disclosure. Method 600, and any method described herein, may be implemented as instructions encoded on a computer-readable medium that is to be executed by a processor in a computer system. Method 600, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 600 may begin in block 602.

In block 602, logger 112 receives a log output from an application (e.g., application 110 in FIGS. 1 and 2). Logger 112 may receive the log output directly from application 110 or through hypervisor 104 (FIG. 2). Block 602 may be followed by block 604.

In block 604, logger 112 records the log output as a line in a log file. Block 604 may be followed by block 606.

In block 606, logger 112 generates an LCR for the log output by encoding the full stack with its stack frames and variables in the stack frames. When logger 112 runs in a virtual machine (e.g., virtual machine 106 in FIG. 1), logger 112 may access the call stack via a guest OS (e.g., guest OS 108 in FIG. 1) of the virtual machine. When logger 112 is part of a hypervisor (e.g., hypervisor 104 in FIG. 2) or a component having the proper API to hypervisor 104, logger 112 may access the call stack via hypervisor 104. Block 606 may be followed by block 608.

In block 608, logger 112 determines if there is any more log output. If so, block 608 loops back to block 602. Otherwise, block 608 may be followed by block 610. There are more log outputs if application 110 continues to run.

In block 610, logger 112 attaches the LCRs to the corresponding lines of log outputs in the log file. Block 610 may be followed by block 612.

In block 612, logger 112 groups the log outputs in the log file based on their LCRs. As described above, logger 112 may determine a distance between every pair of LCRs of the log outputs and then group the log outputs based on distances of their LCRs. The distance between two LCRs may be the weighted sum of the numbers of different variables between every pair of corresponding stack frames in the LCRs. As described above, logger 112 may use machine learning clustering to group the log outputs based on their distances. Block 612 may be followed by block 614.

In block 614, logger 112 determines a common context, such as a common thread, for each group of log outputs. During troubleshooting, a support engineer may use the grouping of the log outputs or each group's common context to identify the cause of an error in system 100 or 200 (FIG. 1 or 2) and correct the error. Alternatively, logger 112 may be automated using logical rules or machine learning to use the grouping of the log outputs or each group's common context to identify the cause of an error in system 100 or 200 and correct the error.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for log analysis in a computing system, comprising:
receiving log outputs from an application;
generating a log file, comprising:
recording the log outputs in the log file; and
for each log output in the log file, attaching a log context record to the log output, wherein the log context record is encoded with a call stack comprising stack frames and one or more variables in the stack frames; and
grouping the log outputs in the log file based on the log context record attached to each log output.

2. The method of claim 1, further comprising retrieving the call stack from a hypervisor.

3. The method of claim 1, further comprising retrieving the call stack from a guest operating system in a virtual machine.

4. The method of claim 1, wherein grouping the log outputs in the log file comprises:
determining a distance between every pair of log context records of the log outputs in the log file; and
grouping the log outputs based on distances of their log context records.

5. The method of claim 4, wherein grouping the log outputs based on the distances of their log context record comprises using machine learning clustering.

6. The method of claim 4, wherein determining the distance between a pair of log context records comprises:
for corresponding pairs of stack frames from the pair of log context records, calculating numbers of different variables in the stack frames; and
calculating a weighted sum of the numbers of different variables as the distance.

7. The method of claim 6, wherein determining the distance between a pair of log context records further comprises:
filling any call stack with less than a greatest number of stack frames among the call stacks with a number of empty frames so all the call stacks have a same number of stack frames.

8. The method of claim 1, further comprising determining a common thread, session, or transaction for each group of log outputs.

9. The method of claim 8, further comprising determining a cause of an error in the computing system based on the grouping of the log outputs and correcting the error in the computing system.

10. A non-transitory, computer-readable storage medium encoded with instructions executable by a processor to implement the method of claim 1.

11. A computer system, comprising:
a processor; and
a non-transitory, computer-readable medium having stored thereon instructions that, in response to execution by the processor, cause the processor to:
receive log outputs from an application;
generate a log file by:
recording the log outputs in the log file; and
for each log output in the log file, attaching a log context record to the log output, wherein the log context record is encoded with a call stack comprising stack frames and one or more variables in the stack frames; and
group the log outputs in the log file based on the log context record attached to each log output.

12. The computer system of claim 11, wherein:
the application runs on a virtual machine implemented by a hypervisor; and
the non-transitory, computer-readable medium having stored thereon additional instructions that, in response to execution by the processor, cause the processor to retrieve the call stack through the hypervisor.

13. The computer system of claim 11, wherein:
the application runs on a virtual machine; and
the non-transitory, computer-readable medium having stored thereon additional instructions that, in response to execution by the processor, cause the processor to access the call stack through a guest operating system on the virtual machine.

14. The computer system of claim 11, wherein group the log outputs in the log file comprises:

determining a distance between every pair of log context records of the log outputs in the log file; and grouping the log outputs based on distances of their log context records.

15. The computer system of claim 14, wherein grouping the log outputs based on the distances of their log context record comprises using machine learning clustering.

16. The computer system of claim 14, wherein determining the distance between a pair of log context records comprises:

for corresponding pairs of stack frames from the pair of log context records, calculating numbers of different variables in the same stack frame; and calculating a weighted sum of the numbers of different variables as the distance.

17. The computer system of claim 16, wherein determining the distance between a pair of log context records further comprises:

filling any call stack with less than a greatest number of stack frames in all call stacks with a number of empty frames so all the call stacks have a same number of stack frames.

18. The computer system of claim 11, wherein the non-transitory, computer-readable medium having stored thereon additional instructions that, in response to execution by the processor, cause the processor to determine a common thread, session, or transaction for each group of log outputs.

19. The computer system of claim 18, further comprising determining a cause of an error in the computing system based on the grouping of the log outputs and correcting the error in the computing system.

* * * * *